United States Patent
Inada et al.

(10) Patent No.: US 6,430,957 B1
(45) Date of Patent: Aug. 13, 2002

(54) METHOD AND APPARATUS FOR THERMAL TRANSPORTATION USING POLYVINYL ALCOHOL

(75) Inventors: Takaaki Inada; Akira Yabe, both of Tsukuba (JP); Svein Grandum, Finstadjordet (NO); Shu-Shen Lu, Tsukuba (JP)

(73) Assignee: Agency of Industrial Science & Technology Ministry of International Trade & Industry, Tokyo (JP)

( * ) Notice: Subject to any disclaimer, the term of this patent is extended or adjusted under 35 U.S.C. 154(b) by 0 days.

(21) Appl. No.: 09/537,407

(22) Filed: Mar. 29, 2000

(30) Foreign Application Priority Data

May 25, 1999 (JP) .............................. 11-145710

(51) Int. Cl.⁷ ................................................ F25D 11/00
(52) U.S. Cl. ................................ 62/430; 62/434; 62/114
(58) Field of Search .......................... 62/434, 114, 430

(56) References Cited

U.S. PATENT DOCUMENTS

| | | | | |
|---|---|---|---|---|
| 4,334,412 A | * | 6/1982 | Wildfeuer | 62/333 |
| 4,480,445 A | * | 11/1984 | Goldstein | 62/434 |
| 4,509,344 A | * | 4/1985 | Ludwigsen et al. | 62/76 |
| 4,554,797 A | * | 11/1985 | Goldstein | 62/434 |
| 4,584,843 A | * | 4/1986 | Pronger, Jr. et al. | 62/123 |
| 4,750,333 A | * | 6/1988 | Husain et al. | 62/118 |
| 5,131,232 A | * | 7/1992 | Uno et al. | 62/62 |
| 5,139,549 A | * | 8/1992 | Knodel et al. | 62/532 |
| 5,572,883 A | * | 11/1996 | Roberts | 62/434 |
| 5,849,213 A | | 12/1998 | Kawagoe et al. | |

FOREIGN PATENT DOCUMENTS

| | | |
|---|---|---|
| JP | 6-74497 | 3/1994 |
| JP | 6-137619 | 5/1994 |
| JP | 8-28912 | 2/1996 |
| JP | 8-75328 | 3/1996 |
| JP | 11-124571 | 5/1999 |
| JP | 2000-087021 | 3/2000 |

\* cited by examiner

*Primary Examiner*—William Doerrler
*Assistant Examiner*—Mark Shulman

(57) ABSTRACT

A thermal transportation method utilizes polyvinyl alcohol which is added to a liquid, and the liquid is cooled to form an ice slurry that is pumped through a pipe to effect the thermal transportation.

37 Claims, 2 Drawing Sheets

METHOD AND APPARATUS FOR THERMAL TRANSPORTATION USING POLYVINYL ALCOHOL

BACKGROUND OF THE INVENTION

1. Field of the Invention

This invention relates to a method and apparatus for thermal transportation utilizing ice slurry moved through a pipe.

2. Description of the Prior Art

Prior art methods of thermal transportation and storage using ice slurry include adding antifreeze protein to a liquid and cooling the liquid to produce an ice slurry that is then stored, or transported by being pumped through a pipe. Methods involving simply cooling a liquid utilize just the sensible heat of the liquid, so the quantity of heat that is transported and stored is relatively small. Also, in the case of methods that just use solid ice, it is difficult to pump the ice through pipes. Moreover, in the case of the prior art methods in which ice is produced from a liquid, since latent heat is accumulated during the phase change from liquid to ice, a large quantity of heat can be transported, and the good flow properties of the ice slurry, which exhibits good response property during thermal utilization, enables it to be pumped through piping.

However, making the ice readily subjectable to secondary recrystallization (growth of the ice crystals) degrades the response property exhibited when the ice slurry is to be dissolved for thermal utilization. Because this can cause clogging of the piping, this method is not suitable for thermal storage for extended periods or for long-distance transportation applications. In the prior art methods described above the addition of antifreeze protein to the liquid enables recrystallization of the ice to be suppressed, making the methods also suitable for thermal storage for extended periods and for long-distance transportation. Antifreeze protein is protein obtained from fish in waters close to the polar regions. It is this protein that prevents the blood of the fish from freezing. However, antifreeze protein is very costly. This means that it is expensive to use ice slurry in which recrystallization is suppressed for thermal transportation.

The present inventors have already proposed a method and apparatus for thermal transportation and storage using a silane coupling agent, alkane thiol or fatty acids in place of antifreeze protein [Papers (B) of The Japan Society of Mechanical Engineers, vol. 65, No. 630, pp 53–58 (1999-2)]. However, the method and apparatus using synthetic high polymers had a number of problems, including cost, toxicity, corrosiveness and solubility in water, which were enough to keep the method and apparatus from being practicable. More specifically, with respect to the silane coupling agent, the cost was not low enough, in addition to which the material was toxic and not soluble enough in water. Similarly, the corrosiveness of the fatty acids was a problem, as was their toxicity and lack of sufficient solubility in water. With respect also to the alkane thiol, solubility in water posed a problem, and there were also questions relating to the toxicity and corrosiveness of the substance.

This invention was accomplished to overcome the foregoing problems and has as an object to provide a method and apparatus for thermal transportation that lowers the cost of thermal transportation using ice slurry in which recrystallization is suppressed, and also uses materials having good properties in terms of toxicity, corrosiveness and solubility in water.

SUMMARY OF THE INVENTION

For attaining this object, the present invention provides a thermal transportation method utilizing polyvinyl alcohol, the method comprising adding vpolyvinyl alcohol to a liquid, cooling the liquid to which the polyvinyl alcohol has been added to form an ice slurry, and pumping the ice slurry through a pipe.

The above object is also attained by an apparatus for thermal transportation utilizing polyvinyl alcohol, the apparatus comprising a liquid to which polyvinyl alcohol has been added, a freezing means for cooling the liquid to which the polyvinyl alcohol has been added to form an ice slurry, a pipe for transporting the liquid containing the ice slurry, and a pump for moving the liquid in the pipe.

Thus, to achieve its object, the invention uses polyvinyl alcohol instead of the antifreeze protein, silane coupling agent, alkane thiol or fatty acids used in the prior art. The polyvinyl alcohol has the effect of suppressing recrystallization of the ice slurry and is extremely cheap, being about 1/20,000 the price of antifreeze protein. Moreover, polyvinyl alcohol is neither toxic nor corrosive, and exhibits excellent solubility in water. Thus, it enables thermal transportation using ice slurry in which recrystallization is suppressed that is highly stable and highly reliable, and low in cost.

Further features of the invention, its nature and various advantages will become more apparent from the accompanying drawings and following detailed description of the invention.

BRIEF DESCRIPTION OF THE DRAWINGS

FIG. 1($b$) illustrates the reaction between the polyvinyl alcohol and the surface of ice.

DESCRIPTION OF THE PREFERRED EMBODIMENTS

Figure 1A:
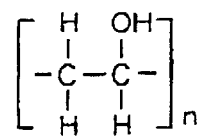
FIG. 1($a$) is the general formula of polyvinyl alcohol.
Figure 1B:
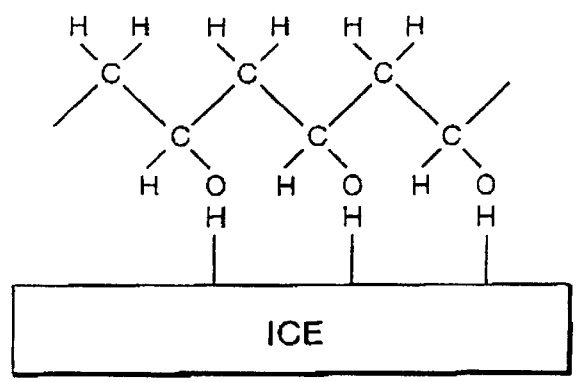

The present invention relates to thermal transportation comprising forming an ice slurry by cooling a liquid containing polyvinyl alcohol, and pumping the ice slurry through a pipe. The general formula of polyvinyl alcohol is $(CH_2C(OH)H)n$, as shown in FIG. 1($a$). —OH is the hydrophilic group and —$CH_2$— is the hydrophobic group. The hydrophilic group —OH of the polyvinyl alcohol molecule forms hydrogen bond with the surface of the ice, as shown in FIG. 1($a$). Since —$CH_2$— is hydrophobic, secondary growth of the ice is suppressed, suppressing ice to ice bonding.

Thus, when polyvinyl alcohol is added to water and the solution cooled, recrystallization of the ice is suppressed. As a result, ice slurry is obtained in which recrystallization is suppressed, enabling the ice slurry to be stored for extended periods and conveyed extended distances through pipes. Studies have shown that with polyvinyl alcohol having a molecular weight of 2000 or more, the above suppression of recrystallization is well exhibited. In the case of antifreeze liquid in general use, it has been necessary to add not less than 10% by weight of a substance that lowers the freezing point of the liquid. However, even when a very small amount of polyvinyl alcohol is added to liquid, 0.1% by weight, for example, the recrystallization is suppressed, enabling the ice slurry to be obtained. Water, which is easy to obtain, may be used as the liquid. However, the liquid is not limited to water, and may be any liquid that dissolves the polyvinyl alcohol.

Figure 2:
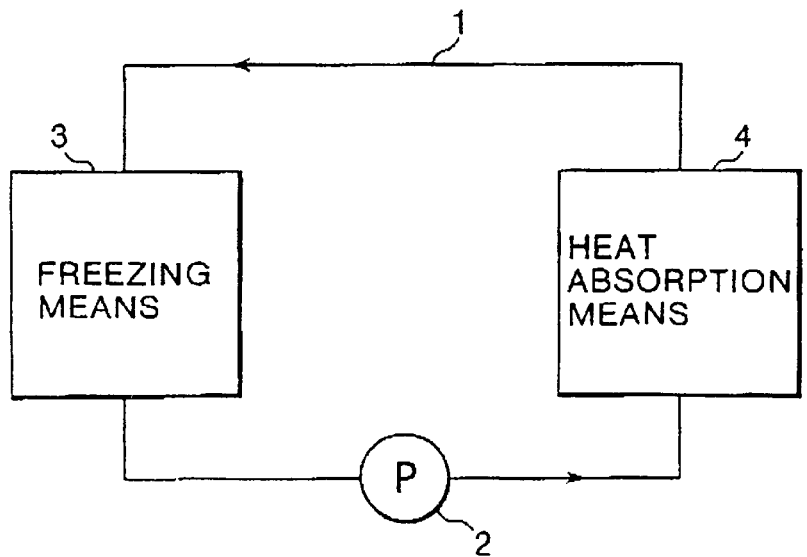
FIG. 2 shows the general system of a thermal transportation apparatus according to a first embodiment of the invention.

The thermal transportation apparatus using liquid containing polyvinyl alcohol in accordance with this invention will now be described. FIG. 2 shows a first embodiment of the apparatus. This thermal transportation apparatus includes a pipe 1 provided with a pump 2, a freezing means 3 and a heat absorption means 4. Sealed in the pipe 1 is a liquid, such as for example water, to which polyvinyl alcohol has been added (hereinafter also referred to as "polyvinyl alcohol solution"). As explained in the foregoing, when the water is cooled, the polyvinyl alcohol serves to suppress ice recrystallization. The freezing means 3 is constituted by a freezer or the like provided for cooling the polyvinyl alcohol solution to produce ice slurry. The pump 2 is used to forcibly circulate the polyvinyl alcohol solution and ice slurry through the pipe 1.

Thermal transportation is effected by the apparatus as follows. The ice slurry in the pipe 1 formed by cooling the polyvinyl alcohol solution at the freezing means 3 is pumped to the heat absorption means 4 by the pump 2. At the heat absorption means 4 the ice slurry absorbs its heat. Upon absorbing its heat the ice slurry reverts to a polyvinyl alcohol solution which is conveyed to the freezing means 3 where it is again cooled to an ice slurry. This repetitive process of cooling and thermal absorption constitutes the thermal transportation process. The addition of the polyvinyl alcohol to the water suppresses the recrystallization of the ice of the ice slurry. By thereby preventing clogging of the pipe 1, thermal transportation for extended periods is enabled.

Figure 3:
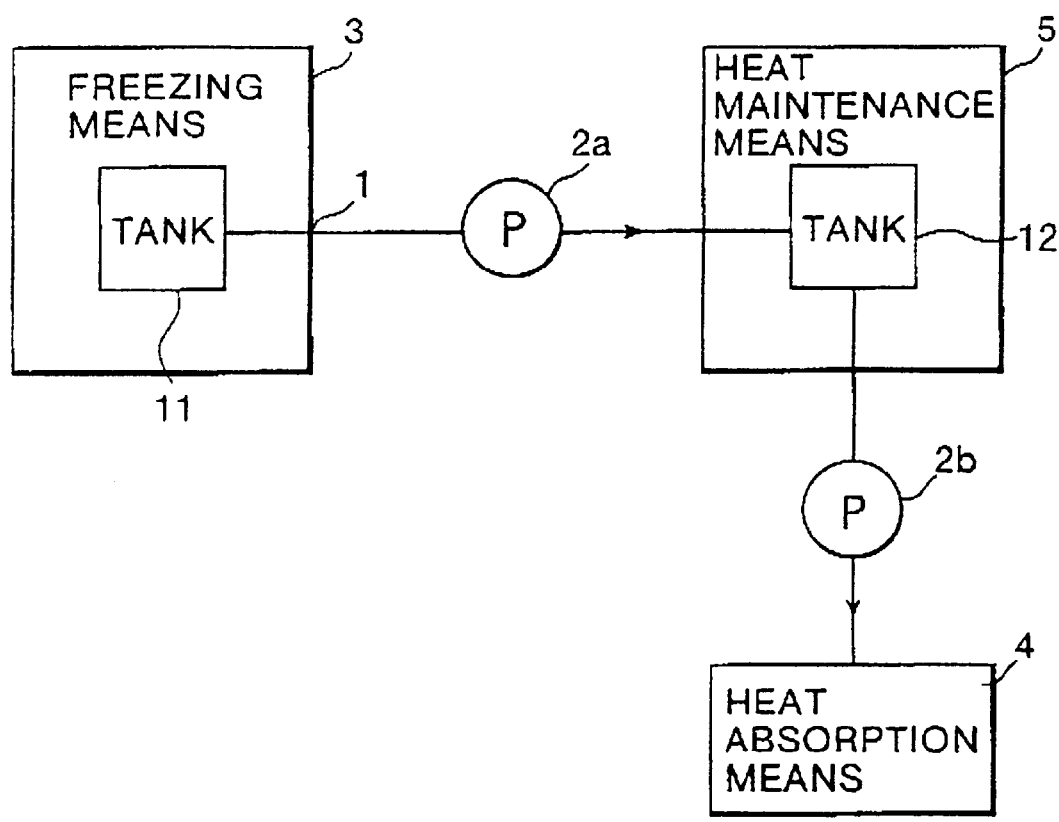
FIG. 3 shows the general system of a thermal transportation apparatus according to a second embodiment of the invention.

FIG. 3 shows the arrangement of a thermal transportation apparatus according to a second embodiment of the invention. This apparatus comprises a freezing means 3 having a tank 11, a pipe 1 containing a polyvinyl alcohol solution, a first pump 2a, a heat maintenance means 5 having a tank 12, a second pump 2b, and a heat absorption means 4. The heat maintenance means 5 holds the ice slurry and delivers it to the heat absorption means 4 as required.

Operation of the thermal transportation apparatus of FIG. 3 will now be described. Polyvinyl alcohol solution in the tank 11 of the freezing means 3 is cooled to an ice slurry. From the tank 11, the ice slurry is pumped into the tank 12 of the heat maintenance means 5 by the first pump 2a. The heat maintenance means 5 serves to maintain the temperature of the ice slurry. When required, the ice slurry in the heat maintenance means 5 is delivered to the heat absorption means 4 by the second pump 2b. Since polyvinyl alcohol has been added to the water, recrystallization of ice in the slurry is suppressed, enabling the ice slurry to be maintained for an extended period in the heat maintenance means 5.

In the foregoing, the embodiments have been described with reference just to the addition of polyvinyl alcohol to the liquid used. However, the invention is not limited to the addition of just polyvinyl alcohol, it being possible to promote ice formation by also adding ice nucleus bacteria. With respect to the bacteria, there can be used Pseudomonas syringae or other such known bacterium that is already used in artificial snow-making systems and the like. The type of ice bacteria and the added amount is determined according to what the ice slurry is to be used for.

Experiments in which ice recrystallization and ice surfaces were observed will now be described.

EXPERIMENT 1

Observation of Ice Recrystallization

The aim of the experiment was to investigate the effect that the polyvinyl alcohol had on the recrystallization of the ice. In the experiment the recrystallization was observed of fine crystals of ice produced using a polyvinyl alcohol solution. Five polyvinyl alcohols were used, having the following average molecular weights: (1) 500, (2) 2000, (3) 31000 to 50000, (4) 85000 to 146000, and (5) 124000 to 186000. For comparison, the recrystallization of ice crystal samples formed using pure water, an ethylene glycol solution, and an antifreeze protein solution was also observed.

For the experiment, drops of the polyvinyl alcohol solutions were dropped from a height of about two meters onto glass plates that had been cooled to −100° C., to allow a thin film of ice (having a polyvinyl alcohol content of 0.1% by weight) to be formed from the fine particle-shaped crystals. The ice film thus formed on the glass plate was left for 14 hours at −7° C. to observe recrystallization of the ice crystals. The same procedures as in the experiment were carried out for the comparative examples. The results were as follows.

(1) Polyvinyl alcohol having an average molecular weight of 500:

Recrystallized ice crystals several hundred micrometers in diameter were observed.

(2) Polyvinyl alcohol having an average molecular weight of 2000:

Recrystallized ice crystals several hundred micrometers in diameter were observed.

(3) Polyvinyl alcohol having an average molecular weight of 31000 to 50000:

Non-recrystallized fine ice crystals no larger than 50 micrometers in diameter were observed.

(4) Polyvinyl alcohol having an average molecular weight of 85000 to 146000:

Non-recrystallized fine ice crystals no larger than 50 micrometers in diameter were observed.

(5) Polyvinyl alcohol having an average molecular weight of 124000 to 186000:

Non-recrystallized fine ice crystals no larger than 50 micrometers in diameter were observed.

In the case of the comparative examples obtained using pure water and those obtained using an ethylene glycol solution, in each case recrystallized ice crystals several hundred micrometers in diameter were observed. In the case of the comparative examples obtained using an antifreeze protein solution, non-recrystallized fine ice crystals no larger than 50 micrometers in diameter were observed.

Based on these results, it was possible to determine the following.

The polyvinyl alcohol samples that exhibited a recrystallization suppressing effect each had an average molecular weight of not less than 31000.

In contrast, the polyvinyl alcohol samples that did not exhibit a recrystallization suppressing effect each had an average molecular weight of 2000 or less.

From this, it could be determined that in order to suppress ice recrystallization, it was necessary to use polyvinyl alcohol having an average molecular weight of more than 2000.

EXPERIMENT 2

Observation of Ice Surface

The aim of the experiment was to elucidate the mechanism of the adsorption of the polyvinyl alcohol on the ice surface. A scanning tunneling microscope (STM) was used to observe the surface of pure water ice and the ice surface on which polyvinyl alcohol having an average molecular weight of 89000 to 98000 was adsorbed. The results are as follows.

In overall terms, the surface of the pure water ice was flat. However, where the polyvinyl alcohol was adsorbed on the ice surface, grooving was observed. Based on the results of the two experiments, the following considerations could be drawn.

In the case of polyvinyl alcohol having an average molecular weight of more than 2000, the hydrogen bonding by the hydrophilic group in the molecules causes the adsorption on the ice surface, and this adsorption suppresses the crystal growth effect of the hydrophobic group in the molecules.

In contrast, polyvinyl alcohol having an average molecular weight of 2000 or less lacks a sufficient number of hydrophilic groups for the hydrogen bonding to result in surface adsorption. Therefore, recrystallization of ice crystals cannot be effectively suppressed.

Based on the foregoing, the present invention has the following effects. In accordance with the invention, a liquid to which polyvinyl alcohol is added is cooled to form an ice slurry. This means that compared to the prior art in which antifreeze protein, silane coupling agents or other such substances are added, an apparatus can be realized that at a much lower cost enables thermal transportation to be effected using ice slurry in which recrystallization is suppressed. Moreover, formation of the ice slurry can be promoted by also adding ice nucleus bacteria to the liquid to which the polyvinyl alcohol has been added. As described in the above, polyvinyl alcohol is low in cost, is neither toxic nor corrosive, and is readily soluble in water. Therefore, adding polyvinyl alcohol to a liquid forms an ideal medium for a method and apparatus for safe and reliable thermal transportation.

What is claimed is:

1. A thermal transportation method utilizing polyvinyl alcohol, the method comprising adding polyvinyl alcohol and an ice nucleus bacterium to a liquid, cooling the liquid to which the polyvinyl alcohol and ice nucleus bacterium has been added to form an ice slurry, and pumping the ice slurry through a pipe.

2. An apparatus for thermal transportation utilizing polyvinyl alcohol, the apparatus comprising a liquid to which polyvinyl alcohol and an ice nucleus bacterium has been added, a freezing means for cooling the liquid to which the polyvinyl alcohol and ice nucleus bacterium has been added to form an ice slurry, a pipe for transporting an ice slurry of liquid PVA and a pump for moving the ice slurry of the pipe.

3. An apparatus for cooling comprising:
 means for freezing;
 means for heat absorption;
 means for connecting the freezing means and the heat absorption means, said connecting means capable of transporting liquid;
 a liquid composition containing polyvinyl alcohol, the composition provided within the connecting means, the composition capable of being formed into an ice slurry; and
 means for pumping the liquid from the freezing means to the heat absorption means via the connection means.

4. The apparatus as recited in claim 3, wherein the freezing means is a freezer.

5. The apparatus as recited in claim 3, wherein the connecting means is a pipe.

6. The apparatus as recited in claim 3, wherein the polyvinyl alcohol has an average molecular weight greater than 2000.

7. The apparatus as recited in claim 6, wherein the polyvinyl alcohol is 0.1% by weight of the composition.

8. An apparatus for cooling comprising
 means for freezing, said freezing means having a tank;
 means for heat maintenance, said heat maintenance means having a tank;
 a first means for connecting the freezing means and the heat maintenance means;
 a first means for pumping, said first pumping means provided in the first connecting means;
 means for heat absorption;
 a second means for connecting the heat maintenance means and the heat absorption means;
 a second means for pumping provided in the second connecting means;
 liquid composition containing polyvinyl alcohol, the composition provided within the first and second connecting means, the composition capable of being formed into an ice slurry.

9. The apparatus as recited in claim 8, wherein the freezing means is a freezer.

10. The apparatus as recited in claim 8, wherein the first connecting means is a pipe.

11. The apparatus as recited in claim 8, wherein the second connecting means is a pipe.

12. The apparatus as recited in claim 8, wherein the polyvinyl alcohol has an average molecular weight greater than 2000.

13. The apparatus as recited in claim 12, wherein the polyvinyl alcohol is 0.1% by weight of the composition.

14. A method for formulating a cooling ice slurry comprising:
 providing a liquid to be pumped through a pipe;
 adding a polyvinyl alcohol to the liquid to form a liquid and polyvinyl alcohol composition; and
 cooling the composition to form an ice slurry.

15. The method as recited in claim 14 wherein the polyvinyl alcohol has an average molecular weight greater than 2000.

16. The method as recited in claim 14, wherein 0.1% by weight of polyvinyl alcohol is added to the liquid.

17. The method as recited in claim 14, wherein an ice nucleus bacterium is added to the composition prior to cooling.

18. A method for using an apparatus for cooling comprising:
 a) providing a means for freezing with a liquid composition containing polyvinyl alcohol;
 b) cooling the liquid composition to form an ice slurry;
 c) pumping the ice slurry to a means for heat absorption to allow the ice slurry to absorb heat in the heat absorption means, such that the ice slurry is in liquid form;
 d) pumping the liquid form of the ice slurry to the freezing means; and
 e) repeating steps a–d.

19. The method as recited in claim 18, wherein the polyvinyl alcohol has an average molecular weight greater than 2000.

20. The method as recited in claim 19, wherein the liquid composition contains 0.1% by weight of polyvinyl alcohol.

21. The method as recited in claim 18, wherein an ice nucleus bacterium is added to the liquid composition.

22. A method for using an apparatus for cooling comprising:
   a) providing a means for freezing with a cooling tank;
   b) cooling a liquid composition containing polyvinyl alcohol within the cooling tank to form an ice slurry;
   c) pumping the ice slurry to a heat maintenance tank contained within heat maintenance means;
   d) pumping the ice slurry to a heat absorption means to allow the ice slurry to absorb heat in the heat absorption means, such that the ice slurry is in liquid form;
   e) pumping the liquid form of the ice slurry to the heat maintenance tank;
   f) pumping the liquid form of the ice slurry to the cooling tank; and
   g) repeating steps a–f.

23. The method as recited in claim 22, wherein the polyvinyl alcohol has an average molecular weight greater than 2000.

24. The method as recited in claim 23, wherein the liquid composition contains 0.1% by weight of polyvinyl alcohol.

25. The method as recited in claim 22, wherein an ice nucleus bacterium is added to the liquid composition.

26. An apparatus for cooling comprising:
   a freezer;
   a heat absorber;
   a pipe connecting the freezer and the heat absorber;
   a liquid composition containing polyvinyl alcohol, said composition provided within the pipe, wherein said composition is capable of being formed into an ice slurry; and
   a pump for pumping the liquid from the freezer to the heat absorber.

27. The apparatus as recited in claim 26, wherein the polyvinyl alcohol has an average molecular weight greater than 2000.

28. The apparatus as recited in claim 27, wherein the polyvinyl alcohol is at least 0.1% by weight of the composition.

29. An apparatus for cooling comprising:
   a freezer, the freezer having a tank;
   a heat maintenance apparatus, the heat maintenance apparatus having a tank;
   a first pipe connecting the freezer and the het maintenance apparatus;
   a first pump provided in the first pipe;
   a heat absorption apparatus;
   a second pipe connecting the heat maintenance apparatus and the heat absorption apparatus;
   a second pump provided in the second pipe; and
   a liquid composition containing polyvinyl alcohol, the composition provided within the first and second pipes, the composition capable of being formed into an ice slurry.

30. The apparatus as recited in claim 29, wherein the polyvinyl alcohol has an average molecular weight greater than 2000.

31. The apparatus as recited in claim 30, wherein the polyvinyl alcohol is 0.1% by weight of the composition.

32. The apparatus as recited in claim 6, wherein the polyvinyl alcohol is 0.1% or less by weight of the composition.

33. The apparatus as recited in claim 12, wherein the polyvinyl alcohol is 0.1% or less by weight of the composition.

34. The method as recited in claim 14, wherein 0.1% or less by weight of polyvinyl alcohol is added to the liquid.

35. The method as recited in claim 14, wherein the liquid composition contains 0.1% or less by weight of polyvinyl alcohol.

36. The method as recited in claim 23, wherein the liquid composition contains 0.1% or less by weight of polyvinyl alcohol.

37. The apparatus as recited in claim 30, wherein the polyvinyl alcohol is 0.1% or less by weight of the composition.

* * * * *